United States Patent [19]

Sanner

[11] 4,288,690

[45] Sep. 8, 1981

[54] ILLUMINATION SYSTEM

[75] Inventor: Medford D. Sanner, Irving, Tex.

[73] Assignee: Recognition Equipment Incorporated, Irving, Tex.

[21] Appl. No.: 88,963

[22] Filed: Oct. 29, 1979

[51] Int. Cl.³ .............................................. H01J 3/14
[52] U.S. Cl. .................................... 250/216; 250/568
[58] Field of Search .................. 235/472, 473, 455; 250/227, 566, 567, 568, 569, 570, 239, 216

[56] References Cited

U.S. PATENT DOCUMENTS

| | | | |
|---|---|---|---|
| 3,976,973 | 8/1976 | Martin et al. | 235/472 |
| 4,115,703 | 9/1978 | Pobras | 250/568 |
| 4,210,802 | 7/1980 | Sakai | 235/472 |

*Primary Examiner*—David C. Nelms

*Attorney, Agent, or Firm*—John E. Vandigriff

[57] ABSTRACT

A system for uniformly illuminating a field of information is provided for optical character readers having a scanning device loosely constrained in movement. Lamps are symmetrically located about the optical axis of a sensor and enclosed within an illuminator. The sides of the illuminator converge at one end to port having dimensions defined by the field to be viewed. A plate between the lamps and the sensor partially encloses the second end of the illuminator with an aperture therein symmetrical to the optical axis of the sensor. The sides of two opposite walls of the illuminator adjacent to the port are cut out to remove a portion thereof to eliminate internal reflections and to give the operator a better view of the information to be scanned.

4 Claims, 5 Drawing Figures

ILLUMINATION SYSTEM

Various problems described above have been avoided through the invention defined in U.S. Pat. No. 4,005,286 which uses an illumination system enclosed in a converging illuminator and having portions of the wall coated with a high defuse reflective material while other parts are coated with a low defuse reflectance material. The coating serves the purpose intended but increases the cost of the illuminator system through the extra step of having to apply the coatings.

The present invention provides a system wherein the application of the coatings is not necessary and other problems in prior art systems are reduced and/or eliminated.

SUMMARY OF THE INVENTION

An illumination system is provided for hand held and other types scanning devices used with optical character recognition systems and operated in a loosely constrained environment. An illuminator enclosure employs a light source symmetrical to the optical axis of a sensor. Walls of the illuminator converge to define a port to be passed in registration with the data field. Opposite walls of the illuminator adjacent to the port have portions removed therein to prevent internal reflection by those portions of the walls which are cut out and also to provide a better field of view for the person using the scanner. The improved field of view aids in moving the scanner over the data to be read and yields more accurate registration therewith.

A plate located between the light source and the sensor partially closes the end opposite the port with an aperture in the plate symmetrical to the optical axis of the sensor preferably tapered to direct primary light away from the sensor.

FIELD OF THE INVENTION

This invention relates generally to a system for uniform illumination of data fields passing in registration with the optical character recognition systems and specifically to an illuminating system embodied within the hand held scanning device wherein portions of two walls of the illuminator are moved to prevent internal reflection and to provide a better view of the material being scanned.

DESCRIPTION OF THE PRIOR ART

Systems for automatically reading alphanumeric data fields have been developed for various uses. In some systems registration between the scanning system and a document may be controlled to minimize reading problems. In merchandisizing operations, however, a hand held reader is used to scan data fields on merchandise or tags. Because of variations in the relative movement between the scan unit and the data field misregistrations occur which cause corresponding errors in character identification. Further cause of such reading errors is the nonuniform illumination resulting from data field skew, tilt and depth of field variations relative to the scanning device.

To alleviate such illumination problems the conventional approach has been to alter the optical design, enclose the optical system with a reflector case, or increase the light intensity and number of lamps within the scan head. Such alternative designs results in complex and bulky optical systems, heating of the scan head, subsequent discomfort to user, and increased power consumption. Where mirror-type reflectors have been used, the illumination problem has been aggravated by the occurence of hot spots and shadows in the data field caused by deformities in the reflector surface.

DESCRIPTION OF THE DRAWINGS

For a more complete understanding of the present invention and the technical advance represented thereby reference is now made to the following description taken in conjunction with accompanying drawings in which.

DESCRIPTION OF PREFERRED EMBODIMENT

Figure 1:
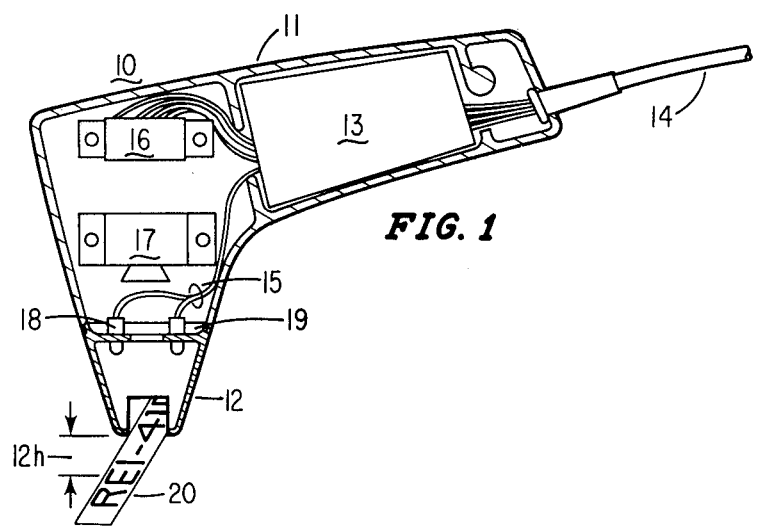
FIG. 1 is a side view of a hand held scanning device employing the invention and having an outer cover cut away to expose internal component parts.

A hand-held scan head or reader 10, as illustrated in FIG. 1, includes an outer housing 11 and a detachable illuminator 12. Housing 11 provides chambers for a video processing unit 13 in electrical communication with external data processing and character recognition units by way of cable 14. A two-dimensional photosensor array 16 in housing 11 is repeatedly and automatically scanned by unit 13 through conductors 15a. A lens system 17 is positioned ahead of array 16. Lens system 17 gathers light reflected by a data field through illuminator 12 and focuses such light upon the surface of the sensor array 16. Lamps 18 and 19 are energized by conductors 15b of cable 14 and are seated within apertures formed in the upper end of illuminator 12. The filaments of the lamps extend into the interior of the illuminator.

In merchandising operations, wand 10 is passed in registration with a data field or merchandise tag 20. The light generated by lamps 18 and 19 is dispersed by the reflecting inner walls of illuminator 12 so as to illuminate tag 20. Light reflected by the data field 20 then passes through port 12a and an aperture 12b of illuminator 12, and is gathered by lens system 17 and focused upon sensor array 16.

It will be recognized that the sweep of reader 10 across the data field 20 may not be at a uniform velocity and may follow a nonlinear path which is not parallel with the plane of the tag. Further, the port 12a may be skewed during all of part of its travel across the data field. The distance 12h may vary from zero but preferably will remain close to zero. The necessarily loose constraints upon use causes undesirable errors in data recognition which are further compounded by variances in illumination over the field of view.

The present invention provides an illuminator which redirects the light produced from sources within wand 10 so as to provide not only uniform two-dimensional illumination to accomodate large tolerance in skew, and tilt, but also to accomodate large tolerances in depth of field (DOF) as the operator varies the distance 12h between a merchanidsing tag and the wand port 12a. Such depth of field variations may occur simply because data field may be placed on irregularly shaped merchandise.

Figure 2:
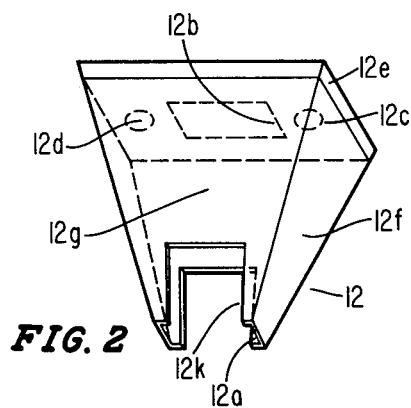
FIG. 2 is a perspective view of an illuminator in accordance with the invention in use in the system of FIG. 1.
Figure 3:
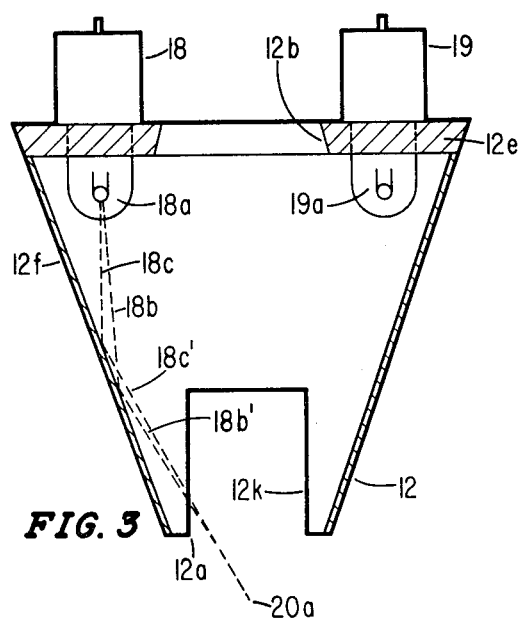
FIG. 3 is a sectional view of the illuminator with lamps seated in place.
Figure 4:
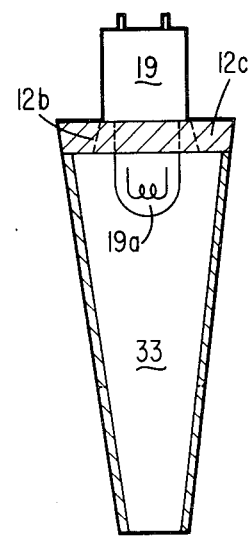
FIG. 4 is a sectional view of the illuminator looking toward another side thereof.

As better seen in FIGS. 2 and 3, illuminator 12 is a four-sided enclosure having side walls 12f and 12g which converge to a port 12a at one end, and diverge to a larger closure plate 12e in the opposite end. A central rectangular aperture 12b is formed in plate 12e. Circular apertures 12c and 12d are symmetrically placed at the ends of aperture 12b. It is to be understood that while aperture 12b is shown as rectangular in FIGS. 2 and 3, other configurations including a circular shape also may be used.

The walls of plate 12e defining aperture 12b are tapered to diverge into illuminator 12 at an angle relative to the filaments in bulbs 18 and 19 to reflect light from lamps 18 and 19 back into the interior of the illuminator. Primary light is prevented thereby from interfering with the two-dimensional image reflected by a data field through aperture 12b.

In the form illustrated in FIG. 3, lamps 18 and 19 are seated within an aperture 12d and 12c, respectively, with filaments 18a and 19a positioned within the interior of the illuminator chamber. Emanating from the lamp 18 are rays of light, 18b and 18c, which strike an interior wall side 12f below a point over midway down the side wall towards the port 12a and are reflected toward port 12a. When the illuminator 12 is displaced a distance 12h (see FIG. 1) from data field 20, the rays converge to form highly illuminated area 20a on the data field. In addition, the law of inverse square operates upon the reflected rays to cause a rapid fall-off in illumination at the edges of port 12a as the distance between the port and the data field 20 increases.

To prevent these internal reflections from highly illuminated points within the illuminator, portions of the illuminator walls are removed to provide the opening 12k. The eliminating of the reflecting inner walls eliminate hot spots in the data field to be viewed. The cut away portions of the wall permit light to emerge from the illuminator onto the data field and permit the operator to view the data directly under the illuminator to help reduce skew, and tilt which may occur if the scanner is not held squarely adjacent to the data field. The elimination of the coated interiors of the illuminator and the removed portions decreases the material required to manufacture the illuminator thereby reducing the cost thereof. It has been found that the illuminator in the present invention, while having a lower cost, adequately illuminates the data field without causing hot spots or undue internal reflections and provides a better view of the data view thereby permitting the operator to more accurately scan the data field.

Figure 5:
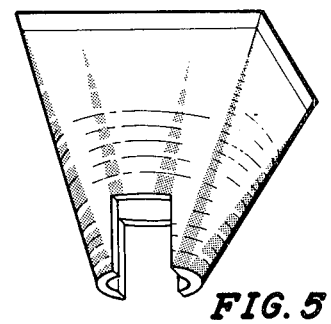
FIG. 5 is another embodiment of an illuminator having an oval cross section.

Another embodiment of the illuminator is illustrated in FIG. 5. The illuminator shown has an oval cross section. Actually, any geometrical cross section is suitable as long as unwanted reflections and/or hot spots are not caused by the side walls.

In accordance with the invention there is provided an optical character reader illuminator which disperses light emanating from a light source so that it uniformly illuminates the data field being scanned and provides the advantages enumerated above.

Having described the invention in connection with certain specific embodiments, it is to be understood that further modifications will be apparent to those skilled in the art and it is intended to cover such modifications as fall within the scope of the apended claims.

I claim:

1. Improvement in a data field illuminator for uniformly brightening a data field viewed by a photo sensor array in an optical character recognition system wherein the illuminator has side walls converging from an enclosure plate to a first aperture, the improvement comprising two additional apertures in opposite side walls of said illuminator, said apertures adjacent to said first apertures.

2. The illuminator according to claim 1 wherein said additional apertures are generally rectangular.

3. An illuminator for uniformly brightening a data field viewed by a photo sensor array comprising enclosure walls symmetrical to the optical axis of said array and joined so as to form a first aperture remote from said array and diverging to an end intermediate to said array and said first aperture and having a second aperture aligned with said first aperture, third and fourth apertures in said enclosure walls adjacent said first aperture, and at least one source of illumination adjacent said second aperture.

4. The system according to claim 3 wherein said third and fourth apertures are spaced opposite each other in said enclosure walls.

* * * * *